UNITED STATES PATENT OFFICE.

CHARLES BILLING, OF LONDON, ENGLAND.

DISINFECTANT, ANTISEPTIC, DEODORANT, OR DETERGENT.

1,336,272.  Specification of Letters Patent.  Patented Apr. 6, 1920.

No Drawing.  Application filed November 29, 1916. Serial No. 134,061.

*To all whom it may concern:*

Be it known that I, CHARLES BILLING, a subject of the King of Great Britain, residing in London, England, have invented a certain new or Improved Disinfectant, Antiseptic, Deodorant, or Detergent, of which the following is a specification.

The active principle and principal ingredient of my new or improved disinfectant, antiseptic, deodorant or detergent is alkali monoborate, that is to say, potassium, sodium or ammonium monoborate. The potassium salt, $K_2O.B_2O_3.3H_2O$ may be taken as typical and representative of the series.

The use of these salts in a solid form is not practicable because the sodium and ammonium salts effloresce, while the potassium salt deliquesces; hence in time they vary in their content of the active principle. Furthermore, when used for dressing wounds they cause unnecessary smarting.

By my invention the first objection is overcome by mixing the monoborate with common salt, while the second is met by adding some diborate, generally one part of the latter to nine parts of the monoborate, though the proportion depends on the nature of the wounds or sores to be dressed, deep or extensive injuries requiring a rather larger proportion of diborate.

The monoborates are most easily prepared by combining an alkali hydroxid in strong solution with the equivalent of boric acid or borax and crystallizing.

When a liquid preparation is required it is preferably prepared in a concentrated and standardized form as follows:—

136.24 parts by weight of caustic potash of 90 per cent. strength are dissolved in 150 parts of water; 145.8 parts of boric acid are then added and when dissolution is complete and the whole has cooled water is added until at 60° F. the solution has a specific gravity 1.42. This is the most convenient strength for handling; 100 fluid ounces of the solution contain 40 ounces by weight of anhydrous salts in the proportion of nine of the monoborate to one of the diborate. An antiseptic acid, such as hypochlorous acid or carbolic acid, or a hypochlorite or an alkali or metal chlorid may be added if required.

For making a dry preparation having the same proportion of monoborate to diborate and the same proportion of the anhydrous salts in the mixture, as in the case of the liquid preparation described above, the preferred procedure is as follows:—

89 parts by weight of caustic soda of 70 per cent. strength are dissolved in 90 parts of water, 438 parts of borax are added and the mixture is heated and stirred until the whole is completely fluid. The stirring is maintained while the mixture is cooling so that the solids become granular, and then are added 116 parts of sodium chlorid more or less in proportion to the water lost in the operation, so that the finished product shall contain 40 per cent. of anhydrous borates. One of the functions of the sodium chlorid is to prevent efflorescence of the product.

The ammonium product may be made by neutralizing ammonia solution with the requisite equivalent of boric acid and finishing as prescribed for the sodium product. Either of these products may be mixed with a hypochlorite, an antiseptic acid or an alkali or metal chlorid.

For general use as antiseptics the foregoing products require much dilution; when used dry they may be diluted with borax or a sterilized inert substance.

I am aware that it is well known to use as an antiseptic a disinfectant, deodorant or detergent, boric acid or borax, either alone or together with preparations of soda or potash. Also that crystallized boric acid with borax and potassium chlorid has been recommended as a preservative.

The disadvantages of these present employed compounds, such as boric acid and borax, rests in their acidity. In order that the proper pathological effect may be produced, it is necessary that the blood and lymph be maintained in its alkaline condition, which condition I have discovered is maintained by the use of a monoborate on account of its alkaline properties. The monoborates when used alone, however, have a tendency toward a coagulating effect upon the blood and lymph impeding the healing process, and I have further found that this coagulating effect can be prevented by the addition of sodium chlorid to the monoborate, the proportion of the two compounds naturally varying with the conditions to be upheld, the proportion I have found to be most generally serviceable and operative being 75 to 95 parts of the alkaline monoborate to 25 to 5 parts of the sodium chlorid.

I have further found that these compounds interact during their employment, the results of their mutual use being different and much more effective than that of their individual activities.

I have further found that the activity of the monoborate may be modified, if desired, by the addition of a small amount of an acid reacting alkali-metal diborate, the amount of diborate varying from 10 to 25 per cent. of the amount of the monoborate.

Such preparations, however, have as their essential active ingredient the higher or acid borates and in no case has it been proposed to use the monoborate, nor was the preparation produced an alkali monoborate.

Having thus described the nature of the said invention and the best means I know of carrying the same into practical effect, I claim:—

As a new article of manufacture, a non-efflorescent disinfectant, antiseptic, deodorant or detergent comprising a non-irritant mixture consisting of 75 to 90 parts of an alkali-monoborate, 25 to 10 parts of an alkali-metal diborate, and sodium chlorid.

In testimony whereof I have signed my name to this specification in the presence of two subscribing witnesses.

CHARLES BILLING.

Witnesses:
C. S. HOPKINS,
W. I. SKERTEN.